US005532686A

United States Patent [19]

Urbas et al.

[11] Patent Number: 5,532,686

[45] Date of Patent: Jul. 2, 1996

[54] PROGRAMMABLE TRANSPONDER

[75] Inventors: Donald J. Urbas, Evergreen; David Ellwood, Golden; John Burne, Kittridge, all of Colo.

[73] Assignee: Bio Medic Data Systems, Inc., Maywood, N.J.

[21] Appl. No.: 131,275

[22] Filed: Oct. 4, 1993

Related U.S. Application Data

[63] Continuation of Ser. No. 8,057, Jan. 22, 1993, abandoned, which is a continuation of Ser. No. 737,082, Jul. 29, 1991, abandoned.

[51] Int. Cl.$^{6}$ .......... H04Q 7/00

[52] U.S. Cl. .......... 340/825.54; 340/825.69; 340/825.71; 340/825.72; 340/870.31

[58] Field of Search .......... 340/825.34, 825.54, 340/825.69, 825.71, 825.72, 531, 568, 571, 572; 342/44, 51; 235/382.5, 383, 385, 376, 379, 380; 364/478

[56] References Cited

U.S. PATENT DOCUMENTS

| | | | |
|---|---|---|---|
| 4,459,590 | 7/1984 | Saulnier | 340/825.54 |
| 4,630,044 | 12/1986 | Polzer | 340/825.72 |
| 4,631,708 | 12/1986 | Wood et al. | 340/825.54 |
| 4,742,470 | 5/1988 | Juengel | 340/825.54 |
| 4,807,140 | 2/1989 | Saulnier | 340/825.54 |
| 4,827,395 | 5/1989 | Anders et al. | 340/825.72 |
| 4,831,540 | 5/1989 | Hesser | 364/478 |
| 4,857,893 | 8/1989 | Carroll | 340/572 |
| 4,912,471 | 3/1990 | Tyburski et al. | 340/825.54 |
| 5,041,826 | 8/1991 | Milheiser | 340/825.69 |
| 5,053,774 | 10/1991 | Schuermann et al. | 342/44 |
| 5,113,184 | 5/1992 | Katayama | 340/825.71 |
| 5,250,944 | 10/1993 | Urbas et al. | 340/870.31 |

FOREIGN PATENT DOCUMENTS

| | | |
|---|---|---|
| 0040544 | 5/1981 | European Pat. Off. . |
| 2636188 | 8/1989 | France . |
| 2163324 | 2/1986 | United Kingdom . |

*Primary Examiner*—Glen Swann
*Assistant Examiner*—Andrew Hill
*Attorney, Agent, or Firm*—Stroock & Stroock & Lavan

[57] ABSTRACT

A passive transponder has a power antenna which receives a power signal and a communication antennas which receives a communication signal. An information generating circuit creates a second communication signal in response to the first communication signal and outputs the second communication signal through the communication antenna. The information generating circuit is powered by a power supply which outputs a voltage for powering the transponder in response to the power signal. The information generating circuit includes a reprogrammable EEPROM and an EEPROM interface circuit which operates on the EEPROM by retrieving and storing data in response to the instructions and data contained within the first communication signal.

25 Claims, 7 Drawing Sheets

PROGRAMMABLE TRANSPONDER

This a Continuation of U.S. patent application Ser. No. 08/008,057 filed Jan. 22, 1993, abandoned, which is a Continuation of U.S. patent application Ser. No. 07/737,082 filed Jul. 29, 1991, abandoned.

BACKGROUND OF THE INVENTION

This invention is directed to a passive transponder and, in particular, to a passive transponder which is utilized for identifying an object into which it is imbedded or implanted and which is capable of being programmed or reprogrammed when embedded or implanted.

Transponders for utilization in connection with a scanner system are well known in the art. By way of example, U.S. Pat. No. 4,730,188 is directed to an interrogator transponder system including an interrogator which transmits and receives signals from a passive transponder. One accepted use of the system embodies the implantation of a transponder in an animal or object for identification. This system disclosed in U.S. Pat. No. 4,730,188 includes a single interrogator antenna which transmits a 400 KHz signal which is received by the transponder embedded in the animal and returns in response thereto a divided signal of 40 KHz and 50 KHz. The transponder signal is encoded in accordance with a combination of different frequency components of the transmitted signal to correspond to the preprogrammed ID number stored in a chip contained within the passive transponder. The ID number is preprogrammed at the time of manufacture or may be programmed on a one time only basis after implantation. This ID number allows identification of the object in which the transponder is embedded.

Heretofore known transponders utilize a single antenna coil to both transmit and receive the data. To receive and transmit signals such coils utilize a rectifier and a load across the coil. The change in load is then measured. Additionally, passive transponders obtain their power from the interrogation signal produced by the interrogator. Accordingly, the high frequency communication signal acts as the power source.

Such prior art transponders have been less than completely satisfactory because the use of a high frequency power signal limits the amount of power which may be provided, thus decreasing the communication distance between the transponder and the interrogator. The higher frequencies of the transponder are regulated by the FCC, therefore, the amount of power which may be supplied to the transponder and in turn the read distance, is limited. Additionally, such prior art transponders are limited because the type of information which may be transmitted by the transponder thereby is limited to fixed preprogrammed or first time only programmed identification numbers. Accordingly, in a contemplated use such as animal identification or industrial part identification, the user is limited to the preprogrammed identification number contained within the transponder or the information decided upon by the user at the time of the initial programming. Accordingly, the versatility of the transponder is quite limited to specific first time uses. This requires that the user match any stored information or the task to which the transponder is to be used to the information already existing in the transponder preventing more flexible uses of the transponder or reuse of the transponder resulting in an increase Of time and effort. Accordingly, a passive transponder which allows greater read distance as well as programming flexibility in the form of user re-programmable information is desired.

SUMMARY OF THE INVENTION

Generally speaking, in accordance with the instant invention, a passive transponder is provided. The transponder includes a communication antenna for receiving an interrogator produced communication signal and transmitting data stored in the transponder in response to the communication signal. The transponder includes a power antenna for receiving a low frequency high power signal for providing power to the transponder. Data is stored within the transponder within a reprogrammable memory circuit which may be reprogrammed by the user utilizing instructions and data which form the communication signal.

Accordingly, it is an object of the instant invention to provide an improved passive transponder.

A further object of the invention is to provide a passive transponder having a reprogrammable memory.

Another object of the invention is to provide a passive transponder which conserves power while increasing the transponder read distance.

Still other objects and advantages of the invention will in part be obvious and will in part be apparent from the specification and drawings.

The invention accordingly comprises the features of construction, a combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which.

DESCRIPTION OF THE PREFERRED EMBODIMENT

Figure 1:
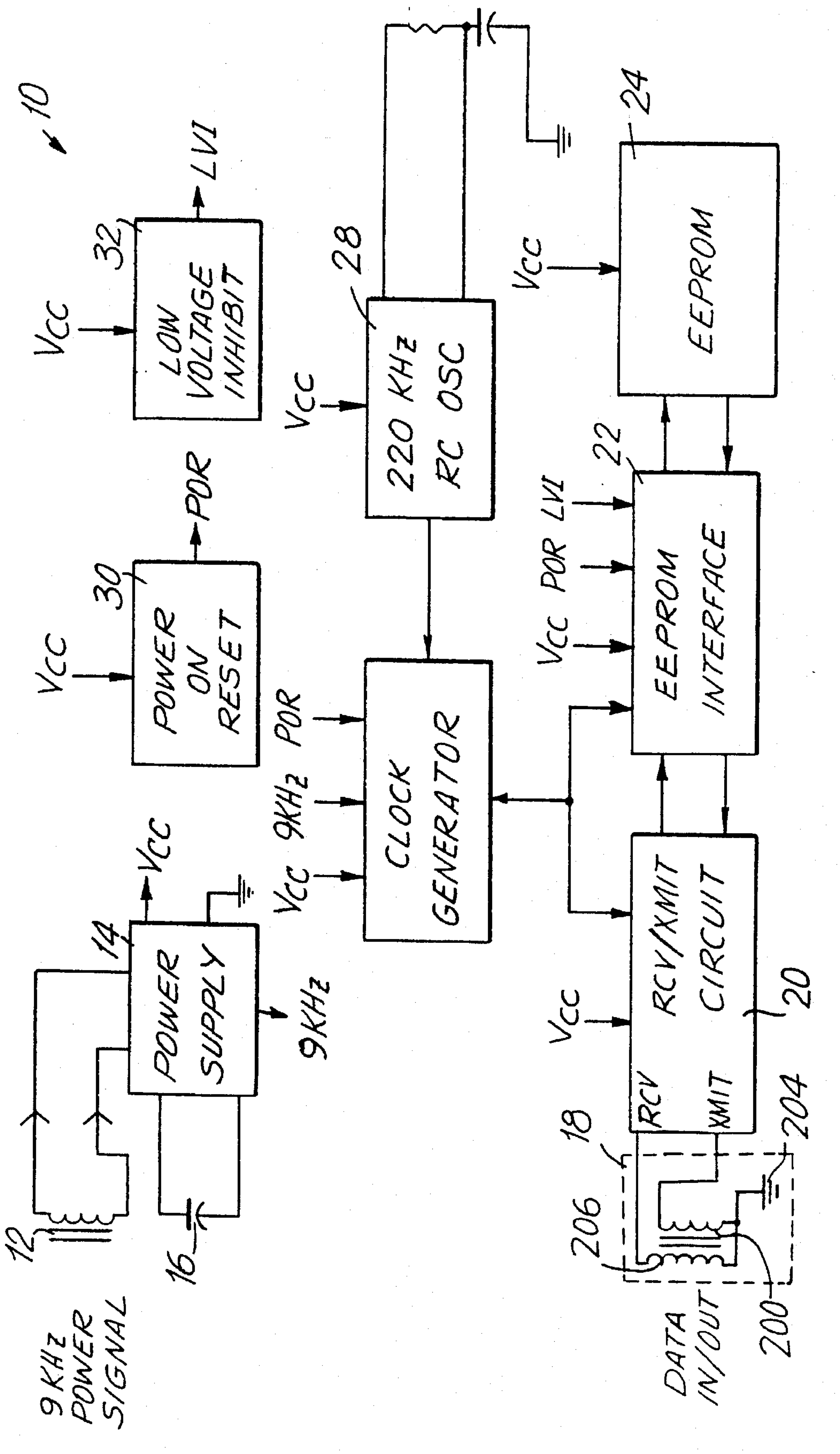
FIG. 1 is a block diagram of a transponder constructed in accordance with the invention.

Reference is first made to FIG. 1 in which a block diagram of a transponder, generally indicated as 10, constructed in accordance with the invention is provided. Transponder 10 includes a power antenna 12 formed as a single inductive coil for receiving a 9 Khz power signal from an interrogator or the like for powering transponder 10. A power supply 14 is coupled between ground and a smoothing capacitor 16. Power supply 14 is coupled to power antenna 12. An electromagnetic field providing an external 9 Khz power signal is applied to power antenna 12 by a programming interrogator inductively coupling transponder 10 with the programming interrogator (not shown) or the like as known in the passive transponder prior art. Power antenna 12 receives the 9 KHz electro-magnetic field and provides an input to power supply 14. Power supply 14 and capacitor 16 rectify and smooth the 9 KHz power signal. Power supply 14 outputs a 9 KHz clock signal and provides a voltage VCC for powering transponder 10. In an exemplary embodiment, power supply 14, includes a low forward voltage rectifier to allow operation of the transponder in as weak a field as possible.

Data is received by and transmitted from transponder 10 utilizing a communication antenna 18. Data signals, like the power signals, are transmitted by inductive coupling between the programming interrogator and transponder 10. The interrogator outputs a 410 KHz signal which is Manchester encoded and FSK modulated.

Communication antenna 18 is coupled to a receive transmit circuit 20. Communication antenna 18 includes a coil 206 common to both the receive and transmit functions allowing two way communication between transponder 10 and programming interrogator. Coil 206 is coupled between a receive input of receive transmit circuit 20 and a ground 204. Modulation coil 200 is inductively coupled to coil 206 and is connected between the transmit output of receive transmit circuit 20 and a ground 204.

Inductor 200 is tuned to 410 KHz. Since inductor 206 is not loaded it has a high impedance and therefore can provide a signal in the presence of a weak communication signal received from the programming interrogator. Signals are output from transponder 10 by causing a low impedance to ground at the transmit output of receive transmit circuit 20. The low impedance shorts modulation coil 200 which modifies the impedance of coil 206 in response to transmit signals from the transmit output. Because the communication signal (410 KHz) is not used to clock or to power the transponder as was done in prior art, the communication signal can be deeply modulated without interfering with normal transponder function. This allows a more powerful return signal then was previously possible.

Receive transmit circuit 20 demodulates the signal and outputs the data and instructions to an Electronically Erasable Programmable Read Only Memory (EEPROM) interface 22. EEPROM interface 22 accepts and buffers the instructions from receive transmit circuit 20 and decodes the instructions. In response thereto EEPROM interface 22 determines whether data is to be read from, written into, or erased from an Electrically Erasable Programmable Read Only Memory (EEPROM) 24. As will be discussed in greater detail below, EEPROM interface 22 includes a shift register for decoding the instructions and addressing the memory of EEPROM 24. During a READ operation EEPROM interface 22 causes EEPROM 24 to output the data contained therein through the receive transmit circuit 20. Receive transmit circuit 20 Manchester encodes and FSK modulates the data and instructions and causes communication antenna 18 to transmit a Manchester encoded signal modulated between 55 KHz and 36.6 KHz.

EEPROM interface 22 and receive transmit circuit 20 are driven by a clock generator 26. Clock generator 26 receives a 220 KHz input from a 200 KHz oscillator 28. Clock generator 26 also receives a 9 KHz signal from power supply 14 and generates internal clocks of 11 KHz and 18 KHz to drive EEPROM interface 22 and receive transmit circuit 20. When transmitting data, receive transmit circuit 20 and EEPROM interface 22 are driven by an 11 KHz signal. When receiving data, receive transmit circuit 20 and EEPROM interface 22 are driven by an 18 KHz signal output by clock generator 26.

For transponder 10 to operate properly, transponder 10 requires a minimum voltage level to prevent noise or non-detectable signals of too low a power from accessing EEPROM 24. Accordingly, a power on reset 30 receives voltage VCC from power supply 14 and outputs a power on reset signal POR when the voltage detected exceeds 3 volts ensuring a proper reading voltage level. The power on reset signal POR is input at clock generator 26 and EEPROM interface 22 preventing the powering up of the EEPROM interface 22 unless the voltage is greater than 3 volts. A low voltage inhibit circuit 32 also receives the voltage input VCC and outputs a low voltage inhibit signal LVI if the voltage detected is lower than 4 volts. Low voltage inhibit signal LVI is input to EEPROM interface 22 preventing the powering of EEPROM interface 22 when the voltage VCC produced by power supply 14 is less than 4 volts thereby isolating and protecting EEPROM 24 in a second manner. By providing power on reset and low voltage inhibit circuits, inadvertent access to EEPROM 24 is prevented thereby maintaining the integrity of data stored in EEPROM 24.

Figure 2:
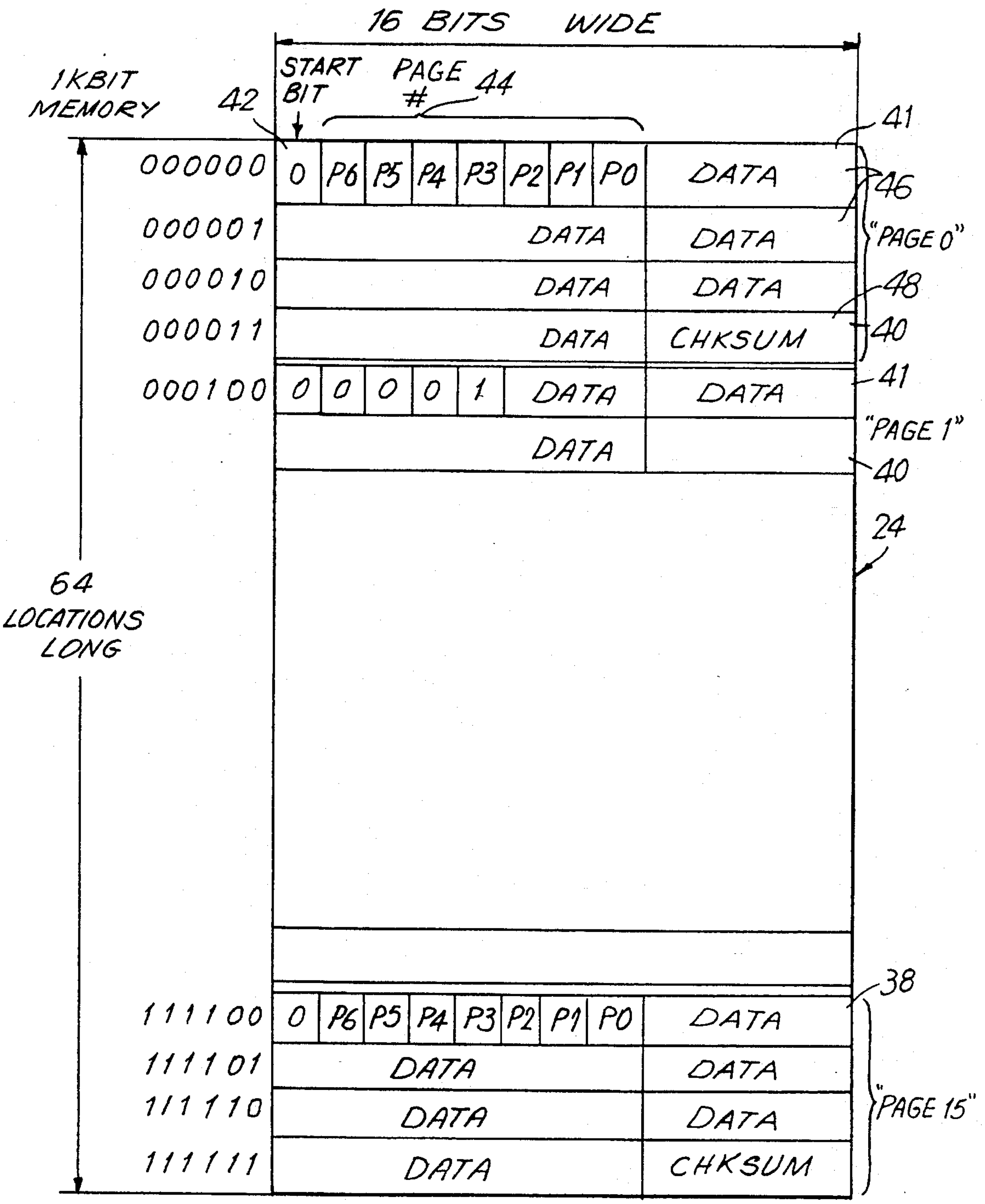
FIG. 2 is a diagram of the memory format for the EEPROM constructed in accordance with the invention.

The memory of EEPROM 24 is formatted as sixteen pages 38 numbered 0 through 15 (FIG. 2). Each page 38 is formed of four words 40. Each word 40 is a sixteen bit data string. The first bit 42 of the first word 41 of each page 38 is a start bit. The next seven bits 44 of the first word 41 store the page number to allow addressing of EEPROM 24. The remaining bits are divided between data bits 46 and check sum bits 48. Check sum bits 48 and data bits 44 are generated by the programming interrogator and stored by transponder 10 in EEPROM 24. Check sum bits 48 are utilized to determine the integrity of data bits 46. Start bit 42 and page number bits 44 are only required in first word 41. The entire word 40 of the second through fourth words 40 of each page 38 are composed of entirely data bits 46 and check sum bits 48.

Generally speaking, the programming interrogator sends a READ instruction to read a specific page address in EEPROM 24, a WRITE instruction to write data at a specific address of EEPROM 24 or no instructions. Transponder 10 remains dormant until it enters a 9 KHz electromagnetic field transmitted by the programming interrogator. Upon entrance into the field, transponder 10 powers up by power supply 14 outputting voltage VCC to power on reset 30, low voltage inhibit 32, receive transmit circuit 20, EEPROM interface 22, EEPROM 24, clock generator 26 and 200 KHz oscillator 28. If this field is strong enough that power supply 14 outputs a voltage VCC greater than 4 volts then both power on reset 30 and low voltage inhibit 32 provide an enabling signal to EEPROM interface 22 and power on reset 30 provides an enabling signal to clock generator 26.

Transponder 10 will always begin by transmitting the first 64 bits of data in EEPROM 24, i.e. the first page 38 of data. EEPROM interface 22 causes EEPROM 24 to output a first page of information through the transmit portion of receive transmit circuit 20 in response to a 11 KHz clock impulse from clock generator 26. Receive transmit circuit 20 Manchester encodes the data and produces a modulated FSK signal through communication antenna 18 corresponding to the data of the first page 38 of stored data in EEPROM 24. To utilize the power signal as a timing signal and a synchronization signal clock generator 26 switches to an 18 KHz output to allow synchronization in a receive mode when transponder 10 is to receive instructions from the interrogator. Transponder 10 then listens for an instruction from the programming interrogator. If transponder 10 receives no instructions it will transmit the next 64 bits of information stored in the EEPROM, in other words, the next page 38 (page 1), of the EEPROM data and then will again listen for instructions from the programming interrogator. If transponder 10 receives a READ instruction signal through communication antenna 18 the instruction signal is demodulated by receive transmit circuit 20. The demodulated signal is then decoded by EEPROM interface 22 and in response to the received signal and the 18 KHz clock of the clock generator 26 locates the specified address within EEPROM 24 and reads out that information. The data is then Manchester encoded and FSK modulated by receive transmit circuit 20 and output on communication antenna 18.

If the received instruction decoded by the EEPROM interface 22 is an instruction commanding the transponder to write the data of the received signal in EEPROM 24, EEPROM interface 22 decodes and stores this instruction. Transponder 10 listens a second time for a second signal. If this signal is not an identical WRITE signal the transponder returns to its default mode and transmits the first 64 bits of data in EEPROM 24. However, if the second signal is identical to the first WRITE signal then the data transmitted to transponder 10 is written into EEPROM 24 at an address specified by the WRITE command signal, thereby providing a more flexible transponder memory by allowing programming of data into a transponder memory; allowing changing of the information contained therein. By utilizing an EEPROM rewriting and overwriting of the data in memory is allowable. As will be seen in greater detail below, during the simplified version of the operation detailed above, there is two way communication between transponder 10 and the programming interrogator. During the above operations status signals are output by the transponder to synchronize clocks with the programming interrogator as well as to notify the programming interrogator as to the status and task being performed by the transponder instructing the programming interrogator what to do next.

In an exemplary embodiment, transponder 10 is capable of performing at least 16 internal tasks, eight tasks in a READ mode in which transponder 10 is reading data from EEPROM 24 and eight tasks when transponder 10 is in a WRITE mode for writing data into EEPROM 24. The basic tasks are detailed in Table 1 below:

TABLE 1

| Task No. | Read Mode | Write Mode |
|---|---|---|
| 1 | Clock instructions into EEPROM | Await repetition of instruction |
| 2 | Transmit sync signal (LO) | Transmit verified signal (LO) or non-verified signal (HI) |
| 3 | Transmit 16 bits of data | Clock instructions into EEPROM |
| 4 | Transmit 16 bits of data | Finishing clocking data into EEPROM, transmit (LO) |
| 5 | Transmit 16 bits of data | Initiate program cycle transmit (LO) |
| 6 | Transmits 16 bits of data | Transmit busy signal during program cycle (LO) and done signal at end of cycle (HI) |
| 7 | Transmits programmer sync and listens for instruction from programmer | Transmits programmer sync and listens for instruction from programmer |
| 8 | Decode instruction transmit (HI) | Decode instruction transmit (HI) |

As discussed above, clock generator 26 outputs a task number as an input to EEPROM interface 22 to determine which task is to be performed upon EEPROM 24.

Figure 3:
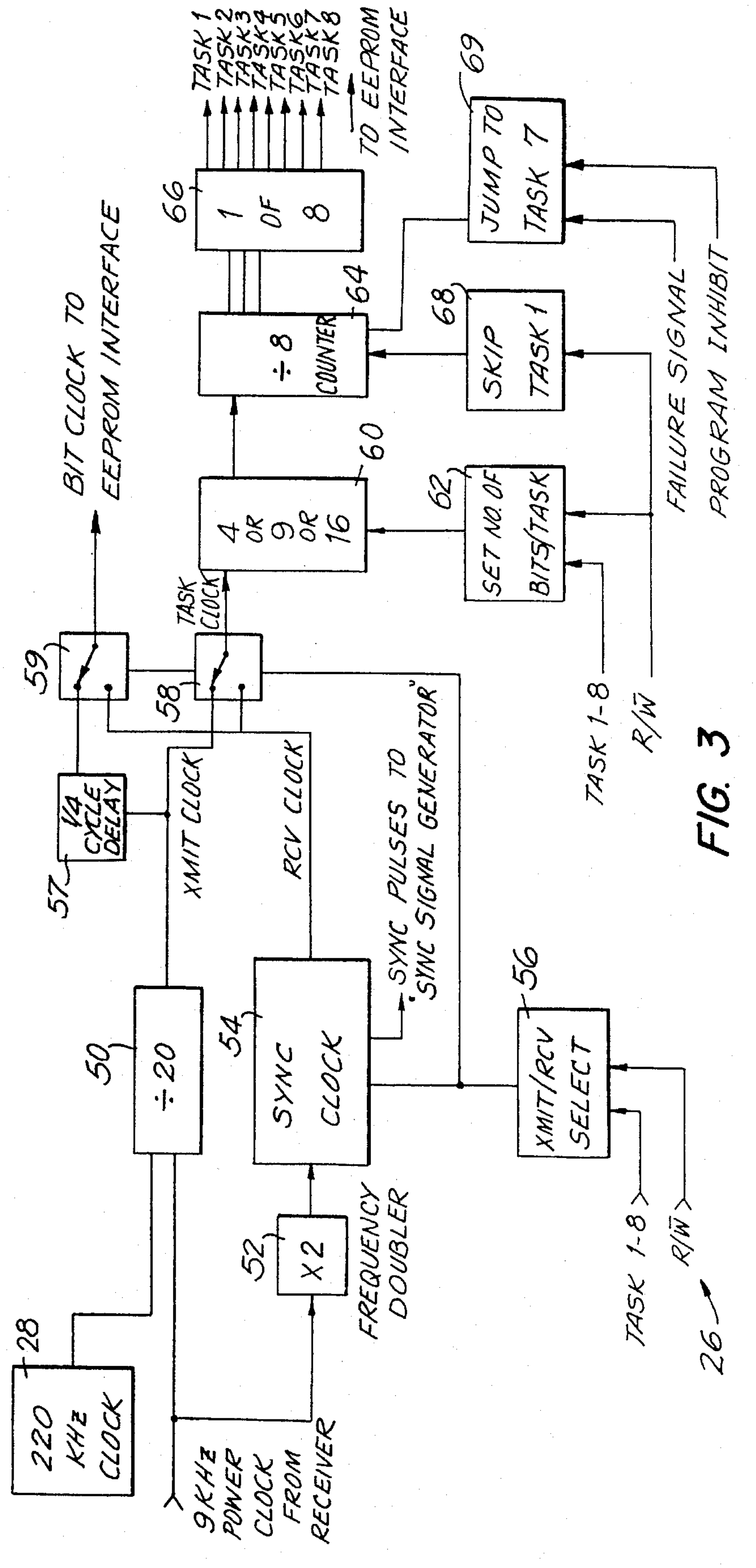
FIG. 3 is a block diagram of a clock generator for a transponder constructed in accordance with the invention.

Reference is now made to FIG. 3 in which a detailed block diagram of clock generator 26 is provided. Clock generator 26 includes a divide by 20 divider 50 which receives both the input from 220 KHz oscillator 28 and the 9 KHz power timing signal from power supply 14 and outputs a 11 KHz transmit clock. Simultaneously, the 9 KHz power signal from power supply 14 is input to a clock doubler 52 outputting an 18 KHz receive clock. A synchronization clock 54 receives an input from a transmit receive selector 56. Transmit receive selector 56 outputs a flag to synchronization clock 54 based upon inputs from EEPROM interface 22 which indicate whether transponder 10 is in a READ mode or WRITE mode and which task is to be performed. Based upon the mode input and task inputs, transmit receive selector 56 indicates to clock generator 26 whether transponder 10 is in a receive or transmit condition. READ tasks 1–6 and WRITE tasks 2, 5 and 6 are executed in a transmit condition. Based upon the flags, synchronization clock 54 outputs a sync pulse utilized by the receive transmit circuit 20 to synchronize the clock used by the programming interrogator and the internal receive clock utilized by transponder 10 when receiving instructions from the programming interrogator. As discussed above, the default operation of transponder 10 is the READ mode task 2, reading out of the memory, so selector 56 originally selects the transmit condition.

Once the mode, READ versus WRITE, is selected based upon the instruction signal, the task to be implemented is determined by clocking and dividing either the transmit clock produced by divide by 20 counter 50 or by the receive clock produced by frequency doubler 52. A task clock 58 receives the transmit clock and receive clock as well as the output of the transmit receive selector 56 and in response thereto switches between the receive clock and the transmit clock. The task clock 58 provides an output to a presettable counter 60 which counts to 4 or 9 or 16 in response to the inputs of task clock 58 as well as a bits per task setting circuit 62. Bits per task setting circuit 62 receives the task number as an input and a READ or WRITE from EEPROM interface 22 input based upon the mode of operation and provides an input to presettable counter 60 based thereon. The count of presettable counter 60 is input to a divide by 8 counter which increments a 1 of 8 task selector 66 by 1 with every clock output from the presettable counter 60. The 1 of 8 task selector 66 provides one of eight possible outputs which correspond to the numbered tasks of TABLE 1. 1 of 8 task selector 66 outputs the next ordered task as an input to EEPROM interface 22 causing EEPROM interface 22 to operate on EEPROM 24 as instructed. It is sometimes necessary to perform a task out of order. Accordingly, divide by 8 counter 64 receives a skip 1 input in response to a READ/WRITE mode input of a skip task 1 generator 68 allowing counter 64 to skip to the count for task 2 when required. Occasionally, it is also necessary to jump to task 7 and the jump to task 7 generator 69 also outputs to divide by eight counter 64 based on a verify failure signal and program inhibit signal.

Task clock 58 also provides an input to a bit clock switch 59 causing bit clock switch 59 to select between the 18 KHz receive clock and the 11 KHz transmit clock which is delayed by one quarter cycle by quarter cycle delay 57. The delay provides time for the logic circuitry of transponder 10 to fall into place prior to transmitting. The output of bit clock switch 59 is a bit clock input to EEPROM interface 22 which clocks the operation of EEPROM interface 22 so that EEPROM 24 is accessed at the proper rate in accordance with the transponder 10 being either in the READ or WRITE mode.

By way of example, if transponder 10 is in the READ mode and task 6 has just been performed, transponder 10 has transmitted the last 16 bits of data of a page 38 being read. Accordingly, the READ mode is provided as input to transmit receive selector 56 along with task number 7, the next numbered task. The next task, task 7, is to listen to the programming interrogator causing task clock 58 to select the 18 KHz receive clock as an input and causing synchronization clock 54 to output 18 KHz synchronization pulses to receive transmit circuit 20 as well as forcing bit clock switch 59 to provide the 18 KHz receive clock to EEPROM interface 22 to operate in accordance with task 7. Additionally, task clock 58, which is switched based upon the task output from transmit receive selector 56, provides an input to presettable counter 60. Presettable counter 60 provides an input to divide by 8 counter 64 causing 1 of 8 task selector 66 to increment the selection to the next task, task 8 which is output to EEPROM interface 22.

As shown in Table 1, task 7 in the READ mode causes transponder 10 to listen for instructions from the programmer. If upon listening for an instruction, an instruction was received, then in accordance with task 8, the next selected task, the instruction would be decoded. If it is a READ instruction then clock generator 26 would jump to task 1 of the READ mode, the next sequential task, switching transmit receive selector 56 to a transmit output, causing EEPROM interface 22 to clock the instructions into EEPROM 24. If the decoded instruction indicates a WRITE function, then transponder 10 would jump to task 1 of the WRITE mode, causing transmit receive selector 56 to cause task clock 58 to select the 18 KHz receive clock and transponder 10 would await repetition of the instructions from the programming interrogator. If neither a READ or WRITE instruction was received, then skip task 1 generator 68 would provide an output to divide by 8 counter 64 causing it to skip task 1 and provide an output to task selector 66 causing task 2 of the READ mode to be performed, the transmission of the low synchronization signal to the programmable interrogator. If transponder 10 is in the WRITE mode and no instruction is received, then skip task 1 generator 68 provides no input and the first 16 bits of data of EEPROM 24 are read by EEPROM interface 22.

Figure 4:
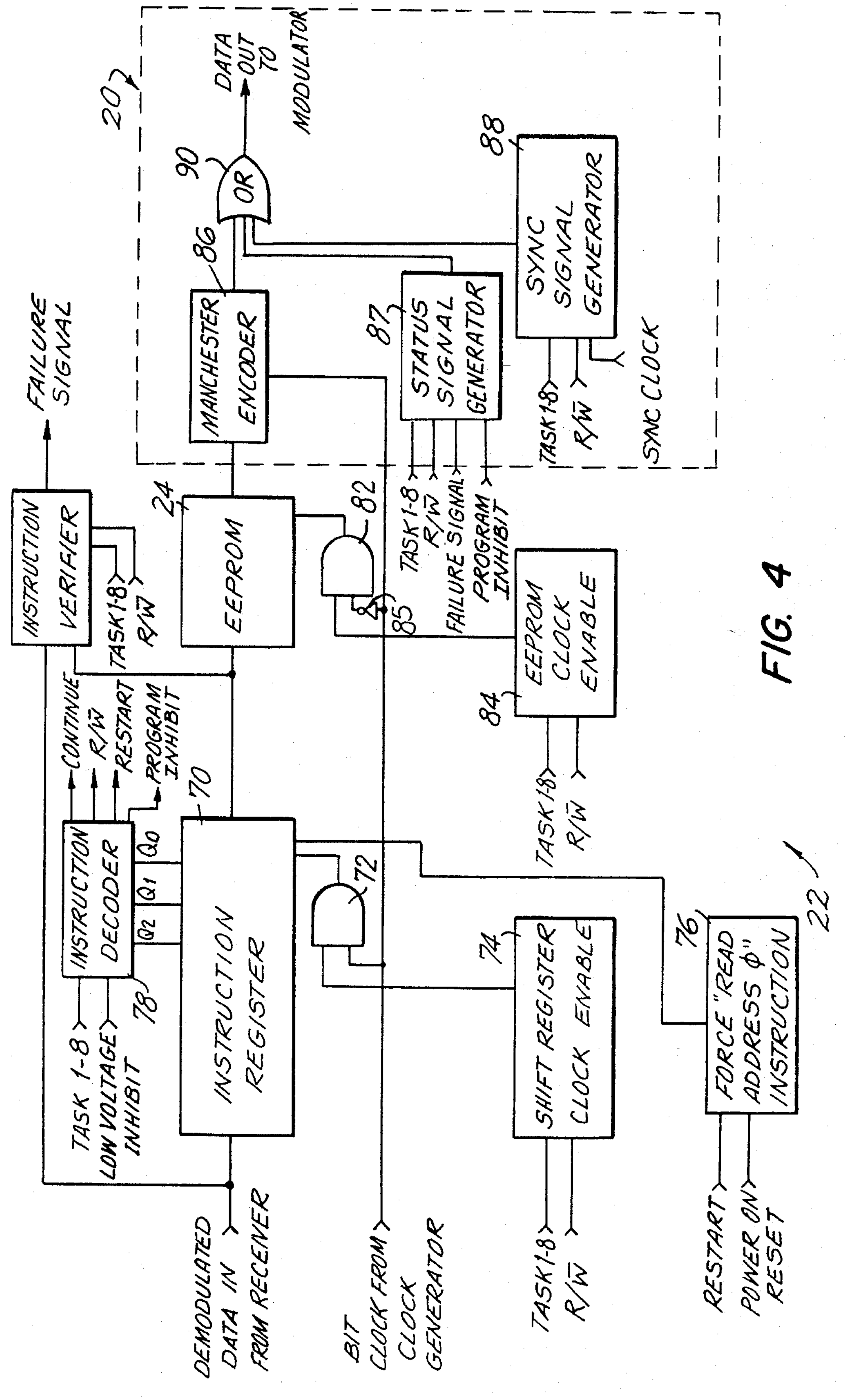
FIG. 4 is a block diagram of an EEPROM interface for a transponder constructed in accordance with the invention.

Reference is now made to FIG. 4 in which a block diagram of EEPROM interface 22 is provided. EEPROM interface 22 includes an instruction register 70 which receives demodulated data from receive transmit circuit 20. An AND gate 72 provides an enabling input to instruction register 70. The bit clock from clock generator 26, from bit clock switch 59, corresponding to either the delayed transmit clock or receive clock is a first input to AND gate 72. Shift register clock enable 74 is a second input to AND gate 72 and provides an enabling output in response to a READ or WRITE mode input and a task number input. Shift register clock enable 74 is high for WRITE tasks 1, 3, 4 and 7 and high for READ tasks 1 and 7. Instruction register 70 receives a third input from a read address 0 instruction generator 76 which provides an output which during the initial operation of transponder 10 provides, as a default, READ data instructions when transponder 10 first enters an electromagnetic field. In response to power on reset signal POR, read address 0 instruction generator 76, causes address 0 to be loaded into instruction register 70 and allows divide by 8 counter 64 to increment to task 1 where the contents of instruction register 70 are shifted into EEPROM 24.

Instruction register 70 outputs the stored instruction to an instruction decoder 78 which decodes the instruction. In response to the stored information of instruction register 70 and a task number input, instruction decoder 78 outputs a READ or WRITE signal (depending on whether the incoming data signal indicates a READ or WRITE task) which is the R/W input of transmit/receive selector 56 and the other circuitry of transponder 10. Instruction decoder 78 outputs a Restart signal if no new signal was received and the previous mode was a WRITE mode causing read address 0 instruction generator 76 to load address 0 into instruction register 70 and to allow divide by 8 counter 64 to increment to task 1 where the contents of instruction register 70 are shifted into EEPROM 24 thereby accessing the first data address in EEPROM 24. Lastly, if no new instruction was received and the previous mode was a READ mode, then the skip task 1 generator causes divide by 8 counter 64 to skip task 1 and begin at task 2 where next sixteen bits of data are read from EEPROM 24. Since AND gate 72 is an AND gate it gates the bit clock through to instruction register 70 in synchronization with the shift register clock enable 74 output for READ tasks 1 and 7 and WRITE tasks 1, 3, 4 and 7 which cause demodulated data to be shifted into instruction register 70.

An instruction verifier 80 receives the shifted output of instruction register 70 and compares it with the demodulated data input to instruction register 70 in response to a READ or WRITE mode input and a task number input. Instruction verifier 80 only operates during WRITE mode task 1. During the WRITE mode, if the two are not identical inputs, instruction verifier 80 will produce a failure signal input to receive transmit circuit 20 and jump to task 7 generator 69 causing divide by 8 counter 64 to jump to task 7 in the WRITE mode and transponder 10 will again listen for a proper instruction. Receive transmit circuit 20 outputs a high signal indicating to the programming interrogator that the signal was not verified in accordance with WRITE task 2. However, if the two instructions do match then instruction verifier 80 will allow divide by 8 counter 64 to continue counting to task 2 where transmit receive circuit 20 will output a continuous low signal indicating to the programming interrogator that the signal has been verified, allowing the WRITE mode to proceed and the shifting of the contents of instruction register into EEPROM 24.

EEPROM 24 also receives an input from an AND gate 82. One input of AND gate 82 is the bit rate clock generated by clock generator 26 which will have either all KHz frequency or an 18 KHz frequency as discussed above. The bit rate clock is inverted by an inverter 85. An EEPROM clock enable 84 receives a READ or WRITE mode determining input as well as a task number input and provides the second input for AND gate 82. EEPROM clock enable 84 allows the bit clock from the clock generator to be input to EEPROM 24 for READ tasks 1 and 3–6, the clocking of instructions into EEPROM 24 and the shifting of the data from EEPROM 24, as well as WRITE instructions 3 and 4, the clocking of the instructions and the data into EEPROM 24. During reading, the contents addressed by the instructions stored in instruction register 70 are clocked out during tasks 3–6 to a Manchester encoder 86 of receive transmit circuit 20. Manchester encoder 86 also receives the bit clock output and the bit clock is mixed with the data from EEPROM 24 to produce a Manchester encoded data at its output. A sync signal generator 88, in response to the synchronization signals from the synchronization clock 54, as well as the READ or WRITE mode input and the task input provides an input to an OR gate 90 along with the Manchester encoded data output by Manchester encoder 86. Status signal generator 87 also inputs to OR gate 90 in response to task inputs, R/W mode, failure signal and program inhibit. The output of OR gate 90 is input to a data modulator of receive transmit circuit 20 The data modulator responds to the output of OR gate 90 by causing receive transmit circuit 20 to transmit the high frequency (55 KHz) when it receives a high signal and by causing a low frequency (36.6 KHz) in response to a low signal. Sync signal generator 88 first causes a transmit sync signal when entering the WRITE mode, synchronization signal.

Figure 5:
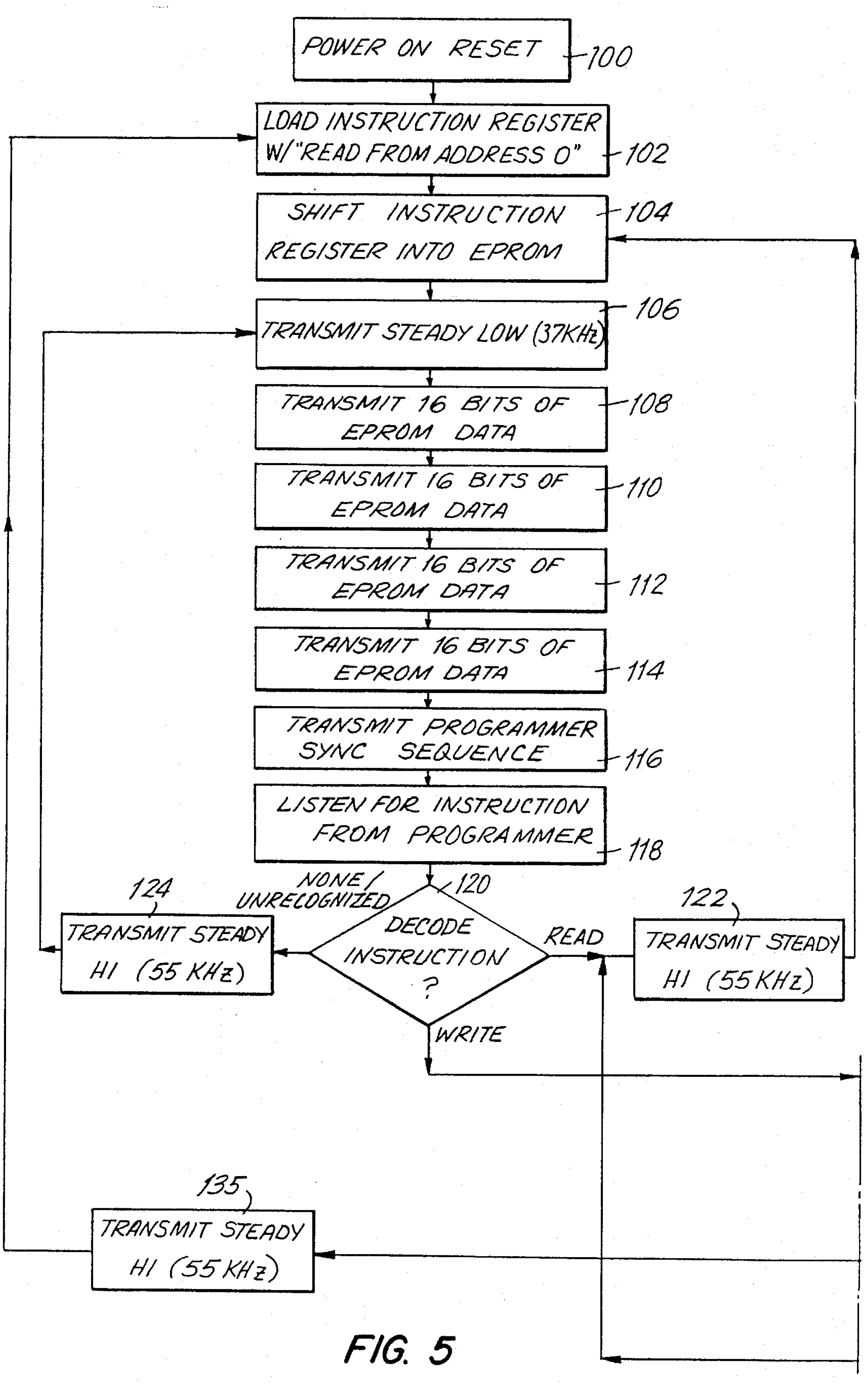
FIGS. 5 and 6 are flow charts detailing operation of the transponder in accordance with the invention.
Figure 6:
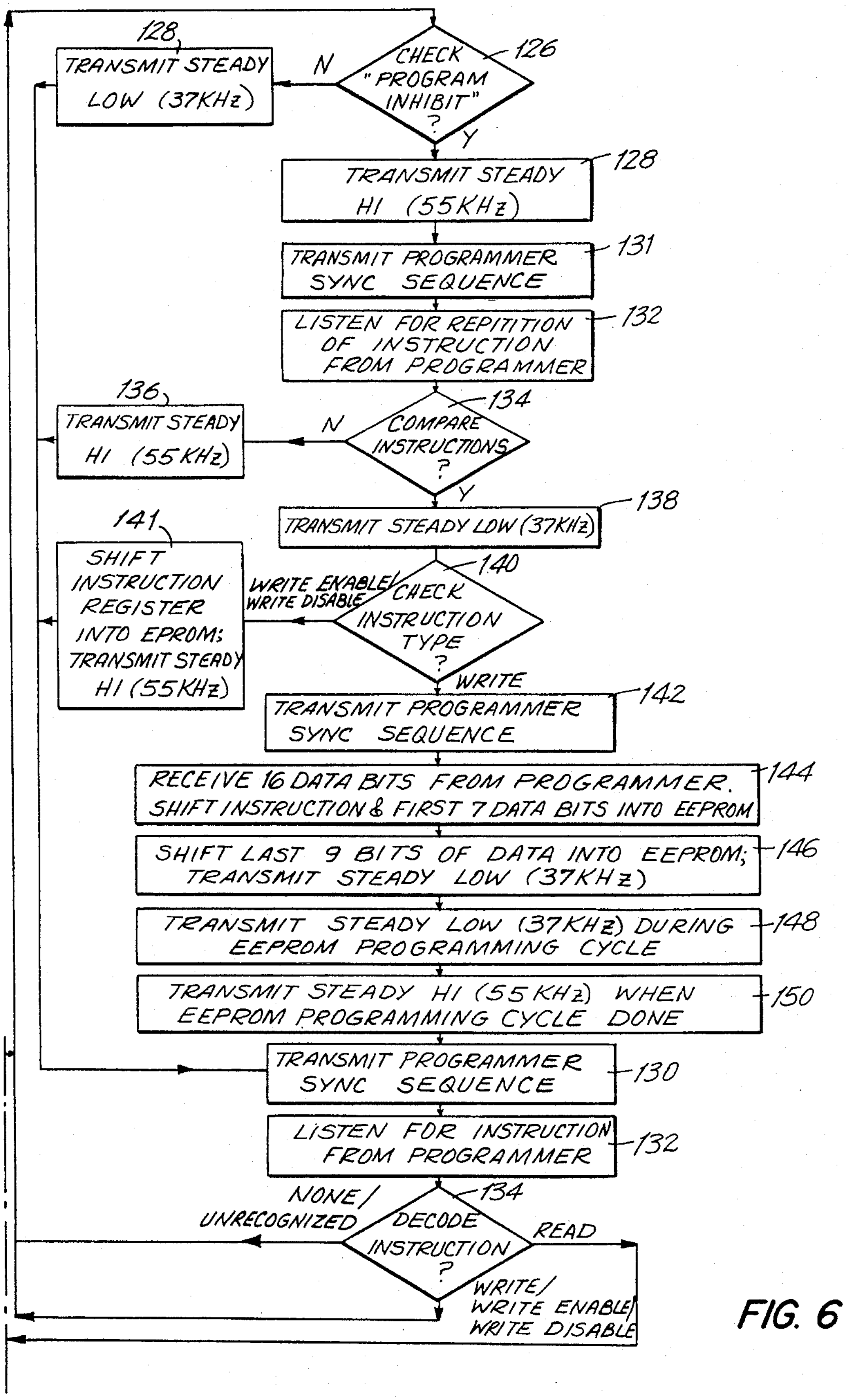

Reference is now made to FIGS. 5 and 6 in which a flow chart illustrating the detailed operation of transponder 10 in accordance with the invention is provided. Transponder 10 is dormant in the absence of the electromagnetic field of a predetermined strength. Once transponder 10 is placed within an appropriate electromagnetic field having a 9 KHz signal, power supply 14 generates a minimum voltage VCC causing power on reset 30 to output power on reset signal POR and low voltage inhibit circuit 32 to output the low voltage inhibit signal LVI allowing powering up of transponder 10 in accordance with a step 100. Transponder 10 enters the electromagnetic field at a time $T_0$ (FIG. 7) and emits a high signal while powering up for a time period $T_1$. In an exemplary embodiment $T_1$ occurs substantially about 7 milliseconds after entering a sustained electromagnetic field.

Figure 7:
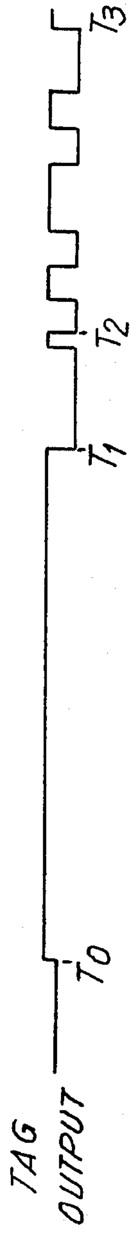
FIGS. 7–9 are timing charts of the output of the transponder operating in accordance with the invention.

As discussed above, the default mode of transponder 10 is the READ mode. Accordingly, read address 0 instruction generator 76, in response to the power on reset signal POR, inputs the instruction to read the first address of EEPROM 24 into instruction register 70 in accordance with a step 102. Receive/transmit selector 56 selects the transmit mode. The first READ mode task is then performed clocking these instructions from instruction register 70 into EEPROM 24 in accordance with a step 104. In accordance with a step 104 READ task 2 is performed and sync signal generator 88 then generates the signals that cause the frequency modulated sync signal output by receive transmit circuit 20 at $T_1$ so that the programming interrogator recognizes the signal as the output of transponder 10. In the embodiment of FIG. 7, the frequency modulated sync signal is a steady low frequency signal (36 KHz) with duration of 4¼ cycles ($T_1$ to $T_2$) of the 11 KHz transmit clock. The interrogator now recognizes transponder 10 allowing them to transmit data between themselves.

As discussed in greater detail above, the continued input of 11 KHz transmit clock of clock generator 20 causes the incrementing of the output of task selector 66 so that the next READ task 3 causes the first 16 bits of EEPROM data to be output through Manchester encoder 86 to receive transmit circuit 20 in accordance with a step 108. As clocking continues and task selector 66 is incremented, this process is repeated by performing READ tasks 4–6 to output the remaining words 40 of the first page 38 of data in EEPROM 24 in accordance with steps 110, 112 and 114. This process occurs from $T_2$ through $T_3$ as seen in FIG. 7.

At the completion of reading out the data, 1 of 8 task selector 66 is incremented to task 7 in which the transponder listens for instructions from the programmer. In response to the selection of task 7, transmit receive selector 56 selects the receive mode and provides an input to synchronization clock 54 which generates a sync signal of 18 KHz receive clock pulses to generator 88 causing a clock synchronization signal to be output since transponder 10 is receiving signals. Task clock 58 causes transponder 10 to operate on the 18 KHz receive clock, which because it is merely a doubling of the frequency of the 9 KHz power clock, is generated synchronously with the 9 KHz power clock.

The generated sync signal is a steady high signal ending at $T_4$ (FIG. 9) followed by a low signal for one cycle of the 18 KHz clock. This indicates to the programming interrogator where the transponder believes the 9 KHz transitions occur allowing synchronization between the internal clock of the interrogator utilized to provide power to transponder 10 and the receive clock utilized by transponder 10 for receiving data. The programmed interrogator sync sequence is transmitted in accordance with a step 116.

Figure 9:
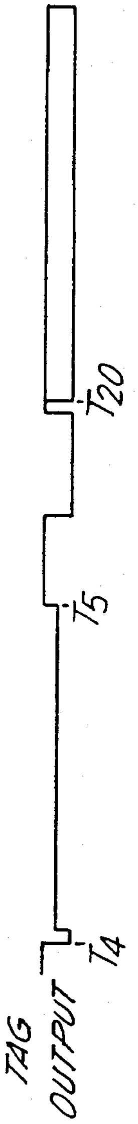

The transmitter portion of transmit receive circuit 20 is then disabled and receive transmit circuit 20 listens for the signal in accordance with a step 118. The programming interrogator transmits data and instructions to transponder 10 during step 118. The data received is demodulated by receive transmit circuit 20 and input into instruction register 70 and decoded by instruction decoder 78 in accordance with a step 120 and task 8 of the READ mode. If the instruction is a READ instruction, task clock 58 selects the 11 KHz transmit clock and causes receive transmit circuit 20 to output a steady high signal to the programming interrogator in accordance with a step 122. The instructions are then shifted from instruction register 70 to EEPROM 24 to read the data from EEPROM 24 at the specified address. While the instruction is being transferred to EEPROM 24, the transmit receive circuit outputs a steady high signal. This signal can be used by the programming interrogator to verify that an instruction was received at transponder 10. Steps 104–118 are then repeated and the low Manchester encoded sync signal is produced followed by the data at $T_{20}$ as seen in FIG. 9. If no instruction or an unrecognized instruction is received in step 118, a steady high signal is again output in a step 124 while decoding occurs. Once it is realized that the instruction is noise or that there is no instruction transponder 10 ignores the instruction and continues by transmitting a steady low Manchester encoded signal in accordance with READ task 2 and step 106 and begins transmitting the next page of data from EEPROM 24 in steps 108 through 118.

Figure 8:
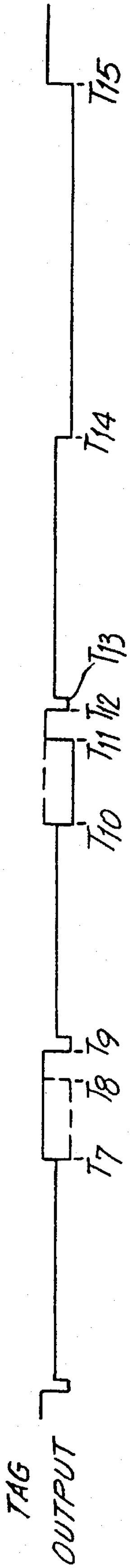

If in step 120, it is determined that a WRITE instruction has been received then it is first determined in accordance with step 126 whether the programming of EEPROM 24 should be inhibited, i.e. whether the voltage VCC exceeds 4 volts to allow writing in EEPROM 24. If the voltage VCC is less than 4 volts then EEPROM interface 22 is not enabled and will not allow writing to EEPROM 24. Transponder 10 outputs a steady low signal at $T_7$ of FIG. 8 as shown in dotted line in accordance with a step 128. In a step 130 transponder 10 again generates the 18 KHz receive clock to listen again for an instruction from the programming interrogator in a step 132. As seen at $T_8$ and $T_9$ of FIG. 8, the programmer sync signal is generated after which the transmitter is disabled to allow receiving instructions. The instructions are decoded in a step 134 as discussed. If a READ instruction is found then transponder 10 returns to step 122 and resumes the sequence for reading EEPROM 24 in a step 104. If, the instruction decoded in step 134 is unrecognizable or non-existent another steady high signal is output in a step 135 and transponder 102 returns to the default mode of step 102 and restarts causing read address 0 instruction generator 76 to provide an input to instruction register 70 beginning the reading of the data stored in EEPROM 24 beginning at the first page 38.

If the decoded instruction is a WRITE instruction then transponder 10 again determines whether programming is inhibited in a step 126. If programming is not inhibited then transponder 10 outputs a steady high signal at $T_7$ (FIG. 9) in accordance with step 128. The transmit programmer synchronization sequence at $T_8$ and $T_9$is output in accordance with a step 131. After $T_9$ when the transmitter is disabled transponder 10 performs WRITE task 1 and again listens for the repetition of the WRITE instruction in a step 132.

In a step 134 instruction verifier 80 compares the instruction stored in instruction register 70 with that corresponding to demodulated data input by receive transmit circuit 20. Task selector 66 increments the task number to task 2. If the instructions are not identical then writing into EEPROM 24 is prohibited preventing inadvertent writing in EEPROM 24 maintaining integrity of the data. If the instructions are not identical as determined in step 134 then task 2 is selected and utilizing the 11 KHz transmit clock a steady state high signal is output at $T_{10}$ shown in dash lines of FIG. 8 in accordance with a step 136 indicating to the programming interrogator that the instructions were not received properly and to send the previous instruction again. Transponder 10 then transmits the programmer sync sequence in accordance with a step 130 and skips to task 7 to listen once again for instructions from the programmer in step 130.

If the compared instructions in step 134 match and are identical instruction verifier 80 causes receive transmit circuit 20 to output a steady low signal clocked by 11 Khz transmit clock at $T_{10}$ shown in solid line in accordance with a step 138. In a step 140 it is determined what type of instruction has been received. If a write enable instruction has been received or at the completion of a writing process, a write disable instruction has been received then the contents of instruction register 70 are shifted into EEPROM 24 and a steady high signal clocked by the transmit clock is output in a step 142. Transponder 10 then places itself in condition to receive the follow-up WRITE instructions or further task instructions in step 130.

If it is determined that a WRITE instruction has been received in step 140 then the sync signal generator 88 transmits a sync sequence at $T_{11}$ at a steady state high signal clocked by the 18 KHz receive clock and steady state low signal at $T_{12}$ in accordance with a step 142. At $T_{13}$ the transmit portion of receive transmit circuit 20 is disabled allowing transmit circuit 20 to receive 16 bits of data from a programming interrogator. The 18 KHz receive clock causes clock generator 26 to increment the task number by 1 so that task 3 is performed. Shift register clock enable 74 provides a high output causing AND gate 72 to clock in 16 bits of data while the instruction, address and the first 7 data bits from instruction shift register 70 are shifted into EEPROM 24 in accordance with a step 144. In accordance with step 146, the task clock 58 and bit clock 59 both switch to the 11 KHz transmit clock the task increments to task 4 and the last 9 data bits are clocked from the instruction register 70 into EEPROM 24 while the transponder outputs a steady state low signal.

During programming or writing in of data to EEPROM 24, transponder 10 must indicate to the programmer interrogator that its EEPROM is currently being utilized. Accordingly, task clock 58 switches to the 11 KHz transmit clock and the task is incremented by 1 which in the write mode is task 5 causing transponder 10 to initiate the program cycle and to transmit a steady state low signal clocked by the 11 KHz transmit clock at $T_{14}$ in accordance with a step 148 until the EEPROM has finished programming. In accordance with a step 150 and task 6 receive transmit circuit 20 outputs a steady state high signal for four cycles of 11 KHz clock at $T_{15}$ signaling to the programming interrogator that transponder 10 is done programming the EEPROM 24.

Task selector 66 is then incremented by 1 and in accordance with task 7 transponder 10 listens for the next programming signal in accordance with step 130 to begin the next cycle of instruction processing.

By providing a programmable transponder having two distinct coils, one for powering up and one for communicating data and instructions in two directions, it becomes possible to use a high frequency for communication allowing higher data rates and a lower unregulated frequency for powering the transponder thus removing restrictions on power output from the programming interrogator and increasing possible communication distances. Additionally, by not wasting the communication energy for powering up the transponder communication becomes more efficient requiring less power as all the power is utilized merely for conveying data and instructions. By providing a power on reset and low voltage inhibitor within the circuit inadvertent noise is inhibited from changing the status of the memory thereby insuring that operations on the memory occur only with sufficient voltage insuring that only valid instructions are utilized on the memory minimizing programming error. By providing a clocking generator in cooperation with EEPROM interface which generates task instructions in response to a communication signal from a programming interrogator which includes both data and instructions it becomes possible to selectively address and operate on an arbitrary address in the memory as well as to overwrite at a selected address in memory providing a more flexible transponder.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A passive transponder for inductively receiving a power signal and a first communication signal and transmitting a second communication signal in response thereto comprising communication antenna means for receiving said first communication signal; power antenna means for receiving said power signal; information generating means for creating said second communication signal in response to said first communication signal, power supply means for directly providing said power signal to said information generating means, said information generating means utilizing said power signal as a clock to generate said second communication signal and said communication antenna means outputting said second communication signal synchronous with said power signal.

2. The passive transponder of claim 1, wherein said first communication signal has a first frequency and said communication antenna means is tuned to said first frequency.

3. The passive transponder of claim 2, wherein said power signal has a second frequency less than said first frequency.

4. The passive transponder of claim 3, wherein said second frequency is less than 10 KHz.

5. The passive transponder of claim 2, wherein said communication antenna means includes a tuned coil and a modulation coil operatively coupled to said tuned coil when said transponder is outputting said second communication signal and is inoperatively coupled to said tuned coil when said transponder is receiving said first communication signal.

6. The passive transponder of claim 3, further comprising clock generating means for producing a receive clock signal and a transmit clock signal as a function of said power signal wherein said information generating means receives said first communication signal in response to said receive clock signal, said receive clock signal having a third frequency and outputting said second communication signal by clocking out said second communication signal in response to said transmit signal, said transmit signal having a fourth frequency.

7. The passive transponder of claim 6, wherein said third frequency of said receive clock signal is an integer multiple of said second frequency.

8. The passive transponder of claim 1, further comprising reprogrammable memory means for storing data received by said communication antenna means, said reprogrammable memory means having a plurality of memory addresses, and memory interface means for selectively addressing an address of said reprogrammable memory means in response to said first communication signal and operating on said address of said memory selected in response to said first communication signal.

9. The passive transponder of claim 8, wherein said information generating means further includes clock generating means for producing a receive clock signal and a transmit clock signal, said clock generating means enabling said memory interface means to receive said first communication signal in response to said receive clock signal and to output said second communication signal in response to said transmit clock signal, said receive clock signal having a frequency different than said transmit clock signal.

10. The passive transponder of claim 9, wherein said first communication signal includes instructions for selecting an address of said reprogrammable memory means and operating on said address.

11. The passive transponder of claim 10, wherein said first communication signal further includes data to be stored in said reprogrammable memory means at said selected address.

12. The passive transponder of claim 10, wherein said instructions are one of WRITE instructions and READ instructions.

13. The passive transponder of claim 8, further comprising operation inhibiting means for preventing operation on said memory if said power supplied by said power supply means is below a predetermined level.

14. The passive transponder of claim 12, wherein said second communication signal includes data stored in said memory means.

15. The passive transponder of claim 14, wherein said second communication signal further includes instructions corresponding to the status of said reprogrammable memory means and memory interface means.

16. The passive transponder of claim 8, wherein said reprogrammable memory means is an EEPROM.

17. The passive transponder of claim 11, wherein said memory interface means reprograms said reprogrammable memory means in response to the instructions of said first communication means by entering the data of said first communication signal at the address of said reprogrammable memory means selected by said communication signal.

18. A passive transponder comprising communication antenna means for inductively receiving a first communication signal and inductively transmitting a second communication signal in response thereto, said first and second communication signals each including data and instructions, reprogrammable memory means for storing data received by said transponder, said reprogram table memory means having a plurality of memory addresses; information generating means for creating said second communication signal in response to said first communication signal, said information generating means including memory interface means for selectively addressing an address of said reprogrammable memory in response to said first communication signal and operating on said selectively addressed memory address in response to said first communication signal.

19. The passive transponder of claim 18, wherein said information generating means further includes clock generating means, said clock generating means including a receive clock and a transmit clock, said clock generating means enabling said memory interface to receive said first communication signal in response to said receive clock and to output said second communication signal in response to said transmit clock, said receive clock having a frequency different than said transmit clock.

20. The passive transponder of claim 18, wherein said first communication signal includes instructions for selecting an address of said memory and operating on said address.

21. The passive transponder of claim 20, wherein said first communication signal further includes data to be stored in said memory means at said selected address.

22. The passive transponder of claim 18, wherein said second communication signal includes data stored in said reprogrammable memory means.

23. The passive transponder of claim 22, wherein said second communication signal further includes instructions corresponding to the status of said reprogrammable memory means and memory interface means.

24. The passive transponder of claim 18, wherein said reprogrammable memory means is an EEPROM.

25. The passive transponder of claim 21, wherein said memory interface means reprograms said reprogrammable memory means in response to the instructions of said first communication means by entering the data of said first communication signal at the address of said reprogrammable memory means selected by said communication signal.

* * * * *